March 31, 1936. W. McARTHUR, JR Re. 19,909
FURNITURE
Original Filed June 16, 1930 2 Sheets-Sheet 1
Fig. 1
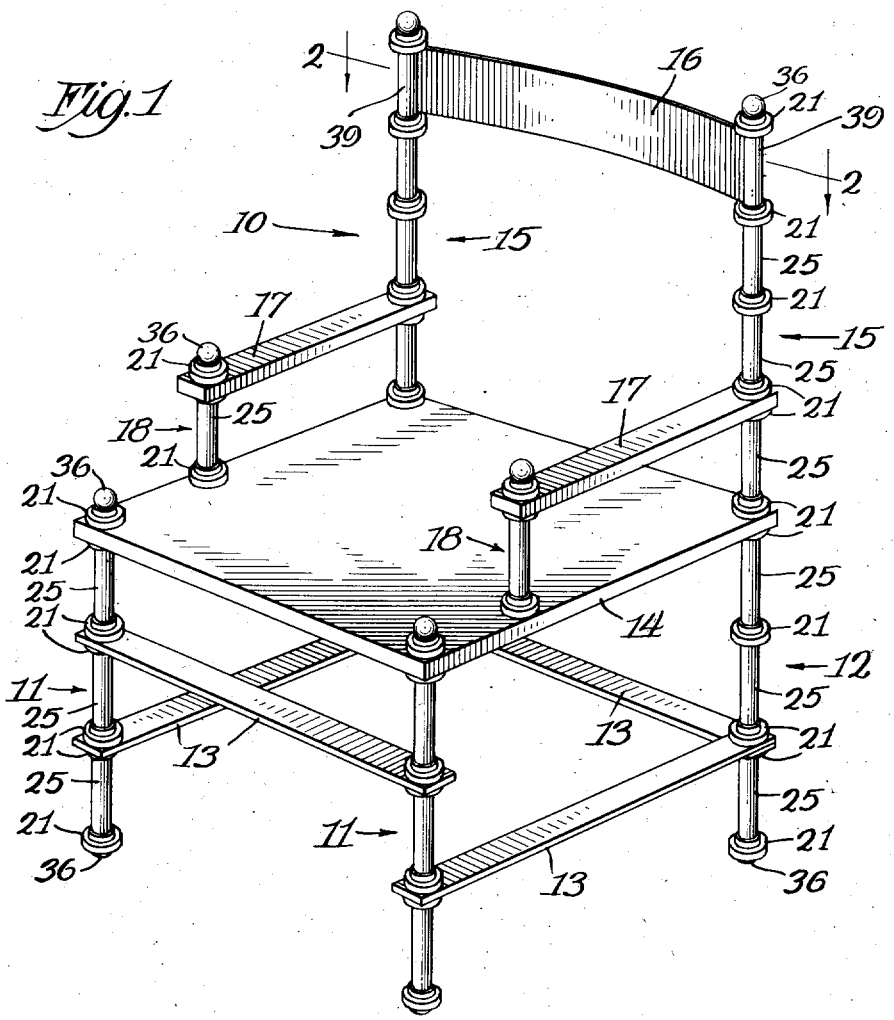
Fig. 2
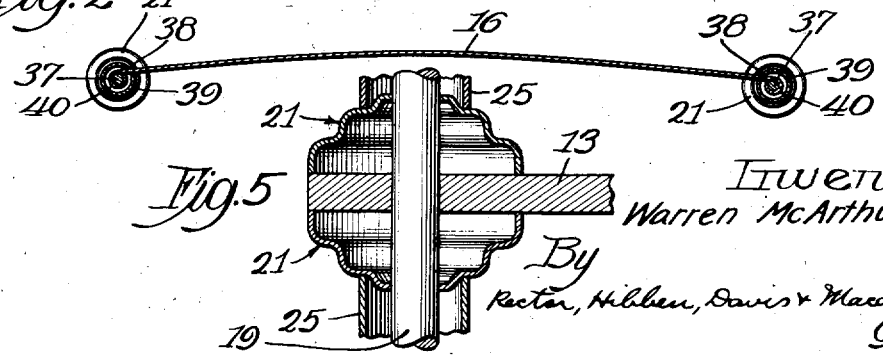
Fig. 5
Inventor
Warren McArthur Jr.
By
Rector, Hibben, Davis & Macauley
Attys.

March 31, 1936. W. McARTHUR, JR Re. 19,909
FURNITURE
Original Filed June 16, 1930 2 Sheets-Sheet 2
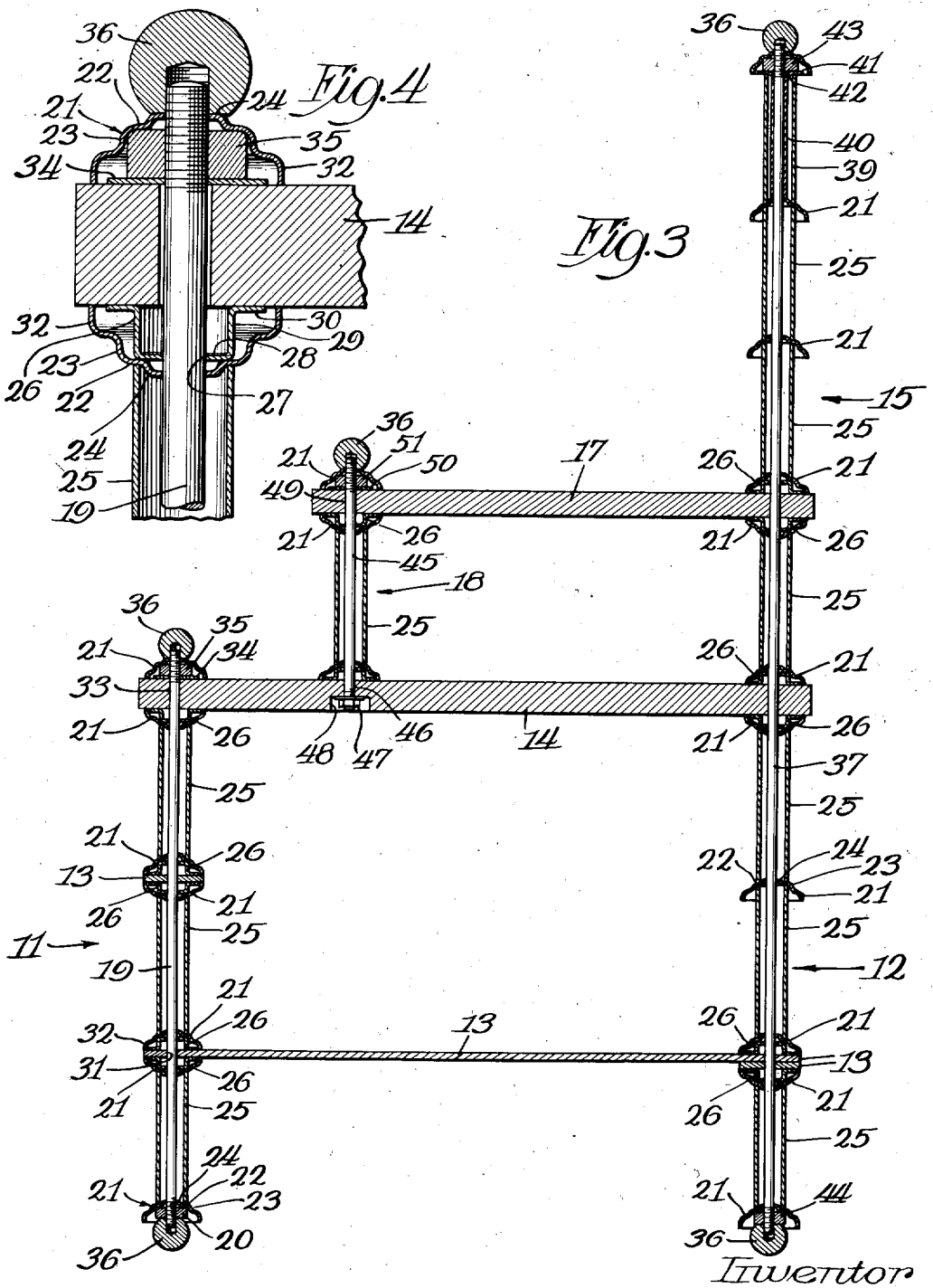
Inventor
Warren McArthur Jr.
By Rector, Hibben, Davis & Macauley Attys.

Reissued Mar. 31, 1936

Re. 19,909

UNITED STATES PATENT OFFICE 19,909

FURNITURE

Warren McArthur, Jr., Rome, N. Y., assignor, by mesne assignments, to Warren McArthur Corporation, Rome, N. Y., a corporation of New York Original No. 1,932,794, dated October 31, 1933, Serial No. 461,322, June 16, 1930. Application for reissue April 4, 1934, Serial No. 719,618

11 Claims. (Cl. 155—194)

My invention relates to furniture and is generally directed towards providing articles of this nature in which the parts are retained together without the use of glue, small screws, nails, or similar fastening materials and devices now common in the industry.

One object of my invention is to devise an article of furniture which is constituted by the assembly of a plurality of small pieces whose relation to each other is such that, under load conditions, they may "give" slightly, so that the article is characterized by a certain degree of flexibility which, in some kinds of furniture such as chairs and the like, is reflected in an improved standard of comfort.

A further object is to provide an article of the character described in which the several parts are firmly tied together to achieve maximum strength with a minimum of weight, while also permitting the attainment of a desirable attractiveness in appearance.

A further object is to devise an article of furniture which may be quickly and easily assembled by unskilled labor, and which is capable of being shipped in a knocked-down condition for later assembly.

For purpose of illustration, my invention will be described as applied to a chair, as indicating the essential features thereof, but no restrictive interpretation is to be placed on the invention for that reason, as the details of construction are readily applicable to other types of furniture, such as lounges, tables, dressers and other varieties.

These and further objects of my invention will be set forth in the following specification, reference being had to the accompanying drawings, and the novel means by which said objects are effectuated will be definitely pointed out in the claims.

In the drawings:

Figure 1 is a perspective view of a chair which illustrates one embodiment of my invention.

Fig. 2 is a section along the line 2—2 in Fig. 1, looking in the direction of the arrows, and showing the manner of assembling the back rest to the back standards of the chair.

Fig. 3 is a side, sectional elevation of the chair.

Fig. 4 is an enlarged sectional elevation of a portion of the chair, showing the manner of assembling the seat to the front legs.

Fig. 5 is a sectional elevation showing a modified arrangement of attaching the ends of the brace members to either the front or back legs.

Referring to Fig. 1, the numeral 10 designates my improved article of furniture, fashioned for purpose of illustration as a chair, and which comprises front legs 11, rear legs 12, braces 13 extending between indicated pairs of said legs, a seat 14, back standards 15, a back rest 16 extending between said standards, arm rests 17, and supports 18 for said rests. These several parts are constructed and assembled together in the manner which will now be described.

Generally speaking, the front and back legs, back standards, and arm rest supports are fabricated from a number of smaller pieces which are assembled together in a certain definite manner. Considering a front leg 11 for purpose of example, said leg comprises a rod 19 which is threaded at its opposite ends and on which are mounted the several pieces which create the external appearance of the leg and also sustain the load imposed thereon. A nut 20 is first threaded on the lower end of the rod 19, after which the other pieces which constitute the leg are successively strung on the rod 19 from the opposite, or upper end, thereof, as viewed in Fig. 3.

Specifically, the nut 20 having been positioned, a special washer 21 is slipped on said rod and moved downwardly into engagement with said nut. The washer 21 is preferably formed as a cup-shaped stamping with an intermediate, horizontal, annular portion 22 which is defined by an outer shoulder 23 and an inner shoulder 24, said shoulders extending in opposite direction from the annular portion 22. As mounted in Fig. 3, the washer 21 seats on the nut 20 in inverted position, with the under side of the annular portion 22 contacting with the upper side of the nut 20. A simple tubular sleeve 25 of predetermined length is then slipped on the rod 19 and moved downwardly until the end thereof rests on the upper side of the annular portion 22, after which a second washer 21 is placed on the rod 19, but in a reversed position from that indicated for the lower washer, and with the upper end of the sleeve 25 contacting with the under, or outer, side of the annular portion 22 of the second washer 21.

A special washer 26 having a centrally disposed aperture 27 is then slipped over the rod 19 and said washer is also preferably formed as a stamping with a base 28 which includes the perforation 27, a peripheral wall 29, and an annular flange 30 (see Fig. 4), said flange and said base being disposed at opposite ends of said wall. The washer 26 is positioned on the rod 19 with the base 28 thereof in lowermost position, as viewed in Fig. 3, and with said base resting against the inner, or upper, side of the annular portion 22 of the second washer 21. As shown in Fig. 3, the peripheral wall 29 is substantially in alignment with the wall of the sleeve 25, this construction being adapted for a purpose hereinafter explained. One end of the brace 13 having an aperture 31 is then dropped on the rod 19 and moved downwardly until the underside thereof seats on the upper side of the annular flange 30 on the washer 26. Thereafter, in succession, washers 26 and 21 are placed on the rod 19 in reversed positions from those indicated for the washers 26 and 21 immediately below the brace 13 and they are moved downwardly until the annular flange of the washer 26 rests on the upper side of the brace 13 and the under, or inner, side of the annular portion of the washer 21 rests on the base of the washer 26. The washers 21 comprise an annular hood portion 32 which defines their largest diameter and, as shown in Fig. 3, these hood portions closely approach the opposite surfaces of the brace 13 and completely conceal the washer 26, thereby improving the appearance of the chair.

A second sleeve 25 is then placed on the rod 19 and moved downwardly until its lower end abuts against the outer, or upper, side of the annular portion 22 of the adjacent washer 21. The brace 13 which extends between the front legs 11 and its companion washers 21 and 26 are then mounted on the rod 19 in the same manner as just described for the brace member 13 which extends between a front and a back leg, after which a third tubular sleeve 25 is positioned on the rod 19, followed by successive inverted positionings of the washers 21 and 26. The forward end of the seat 14 which includes a hole 33 is then placed on the rod 19 and moved downwardly until its underside rests against the upper side of the annular flange 30 on that washer 26 which has been last placed in position. A plain washer 34 is then slipped on the rod 19, followed by a plain nut 35 which, when tightened against the lower nut 20 securely positions the several sleeves, washers, and brace members in abutting relation on the rod 19. A washer 21 is then placed on the upper end of the rod 19 as a concealing member for the washer 34 and nut 35, after which a finishing ball nut 36 is threaded on the upper end of the rod 19 and a similar nut 36 is placed on the lower end to provide a smooth, sliding contact with the floor surface, thus completing the assembly of one of the front legs.

Each of the rear legs is assembled in a manner identical with that heretofore described for a front leg, the only changes occurring where it is necessary to establish a joint between two brace members 13 and the rear leg, as shown in Fig. 3, and this step is accomplished merely by placing the ends of the brace members in overlapping position. A second change occurs where it is unnecessary to provide for a joint connection for one end of a brace member between a pair of tubular sleeves 25. In such a case, a single washer 21 is interposed between the sleeves 25, with the inner shoulder 24 extending upwardly within the upper sleeve 25 and the outer shoulder 23 depending externally of the upper end of the lower sleeve 25, the opposed end edges of said sleeves contacting with the opposite sides of the annular portion 22 of the washer.

As a simplification of the construction, it is contemplated that the back standards 15 will be constituted by an upward continuation of the back legs 12 and for this purpose, a longer, central rod 37 is employed in the construction of the back legs, but otherwise this last-named rod is identical with the rod 19 and is threaded at its opposite ends. The connection of the rear edge of the seat 14 with the rod 37 is made in the same manner as that indicated for the front edge of said seat with the rod 19, except that on the upper side of said seat, washers 26 and 21 are successively placed on the rod 37 in reverse position to those indicated for the same washers on the underside of said seat. A sleeve 25 is then placed on the rod 37, followed by a placing of one end of an arm rest 17 on said rod, together with its companion washers 21 and 26 on the upper and under sides thereof and arranged in the same manner as that indicated for the rear edge of the seat 14. Sleeves 25 and washers 21 are then alternately positioned on the rod 37, with the annular hood 32 of said washers extending downwardly, as shown in Fig. 3, until the required height of the back standards has been attained.

At convenient heights on each of the back standards 15, one of the sleeves 25 is provided with a longitudinal slot 38 which is cut completely through the wall of said sleeve and, for purpose of illustration, these particular sleeves have been designated as the uppermost sleeves in Fig. 3. Prior to the placing of the slotted sleeve 39 on the rod 37, one end of a back rest 16, which may be simply a flat piece of material, preferably slightly flexible, is attached to the rod 37, said end being curled as at 40 (see Fig. 2) to provide an attaching sleeve for this purpose. The sleeve 39 is then mounted on the rod 37 with the slot 38 providing clearance for the back rest 16, after which a plain washer 41 with a depressed central portion 42 for engagement with the upper end of the curled portion 40 on the back rest 16, the sides of the depressed portion engaging the inside of the sleeve 39, is placed on the rod 37 and then a nut 43 is threaded on the upper end of the rod 37 and tightened against the lower nut 44 to securely position the several assembled parts on said rod. The washer 21 is then placed on the rod 37 above the nut 43 for concealment and a finishing nut 36 is threaded on said rod above said washer, with a similar nut on the lower end of said rod for contact with the floor. When positioned, the upper end of the curled sleeve portion 40 abuts against the depressed part 42 of the washer 41 and the lower end of said sleeve portion seats against the base of the adjacent washer 21.

At the forward end of each arm rest 17, the support 18 therefor comprises a central rod 45 which is threaded at its opposite ends. The lower end of said rod passes through a hole 46 provided in the seat 14 and has secured to the end thereof a nut 47 which is housed within a recess 48 provided on the underside of said seat. On the upper side of said seat, washers 26 and 21 are successively slipped on the rod 45 and moved downwardly until they contact with said upper side, with the annular flange 30 of the washer 26 abutting against said seat and the washer 21 serving as a concealment for said last named washer and also as a seat for the reception of the lower end of a tubular sleeve 25 which is next placed on the rod 45. Washers 21 and 26 are then successively positioned on the rod 45 in inverted positions from those placed on the lower end of said rod, with the annular flange 30 of the washer 26 seating against the underside of the forward end of the arm support 17 which is provided with a hole 49 for the passage therethrough of the rod 45. A plain washer 50 is then placed upon the rod 45 for contact with the upper side of the arm support 17, followed by the positioning of a plain nut 51 which tightens the several parts of the support 18 in position against the lower nut 47. A washer 21 is then placed on the rod 45 to conceal the nut 51 and the washer 50, after which a finishing nut 36 is threaded on said rod, thus completing the assembly of the entire chair.

As regards the strength qualifications of the article of furniture above described, it will be observed that where a single washer 21 is interposed between a pair of sleeves 25, the opposed end edges of said sleeves are seated on flat surfaces and in substantial alignment with each other. This alignment is maintained by the provision of the annular shoulders 23 and 24 which positively prevent any tendency of the sleeves to engage in a lateral movement. The purpose of the washers 26 is to prevent any tendency of the washers 21 to flatten out under load conditions or under the application of the tightening strain as produced by the nuts 20 and 35, 43 and 44, or 47 and 51, the annular wall 29 of said washer being in substantial alignment with the walls of the tubular sleeve 25, so that the load is transmitted in straight lines in substantially the same manner as though the several washers 26 were continuations, or extensions, of the sleeves 25. This strength characteristic of the washers 26 is further enhanced by the provision of the annular flange 30 which serves to distribute the load carried thereby over the relatively broad surfaces with which said flanges contact. However, it is contemplated that the washer 26 may be eliminated. If desired, the thickness of the walls of washer 21 may be increased.

The fact that the chair is fabricated of a number of small pieces which are held in position by primary, securing parts which, comparatively speaking, are remotely disposed from each other, enables the parts of which the chair is composed to "give" slightly under load conditions, with a corresponding increase in the comfort obtainable over chairs formed of rigid members. This flexible characteristic is deemed to be one of the most important advantages of this type of construction. It will be particularly observed that the chair, or any other article of furniture constructed in the same manner, may be assembled without the use of glue or the agencies now common in the industry and that it may also be easily and quickly assembled by unskilled labor.

While I have shown one set of elements and combinations thereof for effectuating my improved article of furniture, it will be understood that the same is intended for purpose of illustration only and in nowise to restrict my device to the exact forms and structures shown, for many changes may be made therein without departing from the spirit of my invention.

I claim:

1. Furniture joint construction comprising a member composed of a rod, tubular pieces strung on said rod, a second joint-forming member pierced by said rod between a pair of said pieces and extending laterally from said first-named member, tubular washers on said rod on opposite sides of said second member having peripheral walls substantially in alignment with the walls of said pieces, seating washers interposed between each of said tubular washers and the adjacent tubular piece, and means on said rod for maintaining the parts assembled thereon in abutting relation.

2. Furniture joint construction comprising a member composed of a rod, tubular pieces strung on said rod, a second joint-forming member pierced by said rod between a pair of said pieces and extending laterally from said first-named member, tubular washers on said rod on opposite sides of said second member having annular flanges contacting with said sides and peripheral walls substantially in alignment with the walls of said pieces, seating washers interposed between each of said tubular washers and the adjacent tubular piece, and means on said rod for maintaining the parts assembled thereon in abutting relation.

3. Furniture joint construction comprising a member composed of a rod, tubular pieces disposed on said rod, a second joint-forming member pierced by said rod between a pair of said pieces and extending laterally from said first-named member, tubular washers on said rod on opposite sides of said second member having peripheral walls substantially in alignment with the walls of said pieces, seating washers interposed between each of said tubular washers and the adjacent tubular piece, said seating washers each having a shoulder on one side extending within its companion tubular piece and a shoulder on the opposite side surrounding the end of said tubular washer, and means for maintaining the parts assembled on said rod in abutting relation.

4. Furniture joint construction comprising a member composed of a rod, tubular pieces disposed on said rod, a second joint-forming member pierced by said rod between a pair of said pieces and extending laterally from said first-named member, tubular washers on said rod on opposite sides of said second member having peripheral walls substantially in alignment with the walls of said pieces, stampings in the form of cup-shaped washers interposed between each of said tubular washers and the adjacent tubular piece, each cup-shaped washer having a shoulder on one side extending within the adjacent tubular piece and a shoulder on the opposite side surrounding the end of the adjacent tubular washer, and means on said rod for maintaining the parts assembled thereon in abutting relation.

5. Furniture joint construction comprising a member composed of a rod, tubular pieces disposed on said rod, a second joint-forming member pierced by said rod between a pair of said pieces and extending laterally from said first-named member, tubular washers on said rod on opposite sides of said second member and having annular flanges contacting with said sides and peripheral walls substantially in alignment with the walls of said pieces, seating washers interposed between each of said tubular washers and the adjacent tubular piece, said seating washers each having a shoulder on one side extending within the companion tubular piece and a shoulder on the opposite side surrounding the end of the adjacent tubular washer, and means for maintaining the parts assembled on said rod in abutting relation.

6. Furniture joint construction comprising a member composed of a rod, a tubular piece including a slot mounted on said rod, a second joint-forming member extending through said slot, the end of said second member being curled to encircle the rod within said piece, and means engaging with the ends of said piece and second member for maintaining the same in position on said rod.

7. A chair comprising a pair of back standards, each composed of a rod, tubular pieces and washers alternately strung on said rod, one of said pieces on each rod at the same elevation including a slot, a back rest piece positioned between said standards with the ends thereof extending through said slot, each end of said back rest piece being curled to encircle the rod within said piece, and means on each of said rods for maintaining the pieces and washers assembled thereon in abutting relation.

8. A chair comprising a pair of back standards, each composed of a rod, tubular pieces and washers alternately strung on said rod, a pair of arm rests, each having a rear end positioned on said standard rod between a pair of tubular pieces, means on said standard rod for maintaining the pieces and arm rest assembled thereon in abutting relation, and a rod extending through each forward end of said arm rest for attachment to a convenient part of the chair, tubular sleeves encircling said last-named rod, and washers interposed between the ends of said last-named tubular piece, the arm rests and chair part, respectively, means holding the last named parts together.

9. Furniture joint construction comprising a member composed of a rod, a tubular piece including a slot mounted on said rod, a second member joined to said first mentioned member, said second member extending through said slot and being slidably secured to said rod within said tubular piece, means engaging with the ends of said piece and the edges of said second member for maintaining the same in desired longitudinal position on said rod.

10. A chair comprising a pair of standards, each composed of a rod, tubular pieces and washers alternately strung on said rod, one of said pieces on each rod at the same elevation having a slot therein, a member positioned between said standards with the ends thereof extending through said slots, the ends of said member being slidably secured to said rods within said pieces and means on each of said rods for maintaining the tubular pieces and washers assembled thereon in abutting relation and for preventing longitudinal movement of said member along said rods.

11. The combination in an article of manufacture of a hollow frame member formed by a plurality of aligned tubular elements including a slotted tubular element, an inner rod extending through said elements, a cross frame member extending through the slot of said tubular element and having the end thereof engaging said rod, means cooperating therewith to engage the ends of said slotted tubular element and the opposite surfaces of said cross frame member for maintaining the same in position, and means on said rod for clamping the same together.

WARREN McARTHUR, Jr.